United States Patent
Xin et al.

(10) Patent No.: US 8,059,750 B2
(45) Date of Patent: Nov. 15, 2011

(54) METHOD AND APPARATUS FOR GENERATING TRAINING SEQUENCE CODE IN A COMMUNICATION SYSTEM

(75) Inventors: Yan Xin, Suwon-si (KR); Jong-Soo Choi, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 756 days.

(21) Appl. No.: 12/028,493

(22) Filed: Feb. 8, 2008

(65) Prior Publication Data

US 2008/0212713 A1 Sep. 4, 2008

(30) Foreign Application Priority Data

Feb. 8, 2007 (KR) .................. 10-2007-0012983

(51) Int. Cl.
*H04L 27/36* (2006.01)
(52) U.S. Cl. ........ 375/298; 370/207; 370/292; 375/231; 375/365
(58) Field of Classification Search .................. None
See application file for complete search history.

(56) References Cited

U.S. PATENT DOCUMENTS

| | | | |
|---|---|---|---|
| 5,479,444 A | 12/1995 | Malkamaki et al. | |
| 5,559,723 A | 9/1996 | Mourot et al. | |
| 6,577,615 B1 | 6/2003 | Ritter et al. | |
| 6,584,164 B1 * | 6/2003 | Tuukkanen | 375/365 |
| 7,010,071 B1 * | 3/2006 | Michel et al. | 375/354 |
| 7,016,429 B1 * | 3/2006 | Dogan et al. | 375/279 |
| 7,050,417 B2 | 5/2006 | Kim | |
| 7,079,574 B2 * | 7/2006 | Rafie et al. | 375/232 |
| 2004/0076246 A1 | 4/2004 | Vanderperren et al. | |
| 2004/0151109 A1 * | 8/2004 | Batra et al. | 370/208 |

FOREIGN PATENT DOCUMENTS

| | | |
|---|---|---|
| JP | 59-208948 | 11/1984 |
| RU | 2 220 505 | 12/2003 |
| RU | 2 232 463 | 7/2004 |

OTHER PUBLICATIONS

Manton et al., "A Low Complexity Semi-Blind Channel Identification and Source Recovery Method for Transmission Systems With Guard Intervals", IEEE International Conference on Acoustics, Speech and Signal Processing, vol. 4, May 17-21, 2004.

* cited by examiner

*Primary Examiner* — David C. Payne
*Assistant Examiner* — Adolf Dsouza
(74) *Attorney, Agent, or Firm* — The Farrell Law Firm, P.C.

(57) ABSTRACT

A method and apparatus for generating a TSC in a communication system are provided, in which a pair of sequences A and B having auto-correlation and cross-correlation properties are generated and the TSC is generated by inserting guard sequences Z each having z zero symbols in the most significant bits of the sequences A and B.

20 Claims, 17 Drawing Sheets

| TB 3 | Encrypted Data 58 | TSC 26 | Encrypted Data 58 | TB 3 | GP 8.25 |

156.25 symbols = 0.577 ms

METHOD AND APPARATUS FOR GENERATING TRAINING SEQUENCE CODE IN A COMMUNICATION SYSTEM

PRIORITY

This application claims priority under 35 U.S.C. §119(a) to a Korean Patent Application filed in the Korean Intellectual Property Office on Feb. 8, 2007 and assigned Serial No. 2007-12983, the entire disclosure of which is incorporated herein by reference.

BACKGROUND OF THE INVENTION

1. Field of the Invention

The present invention generally relates to a method and apparatus for generating a training sequence code in a communication system, and more particularly, to a method and apparatus for generating and applying a training sequence code in a Global System for Mobile Communication/Enhanced Data Rates for GSM Evolution (GSM/EDGE) Radio Access Network (RAN) (referred to as GERAN) system.

2. Description of the Related Art

The $3^{rd}$ Generation Partnership Project (3GPP) Technology Service Group-GERAN (TSG-GERAN) working group is concentrating on GERAN evolution to improve performance in terms of data rate and spectral efficiency. To improve downlink and uplink performance, high-order Quadrature Amplitude Modulation (QAM) schemes, 16-ary QAM (16-QAM) and 32-ary QAM (32-QAM), are added to conventional modulation schemes, Gaussian Minimum Shift Keying (GMSK) and 8-ary Phase Shift Keying (8-PSK).

A conventional symbol rate 170.833 symbols/s is added to a new symbol rate 325 symbols/s to increase data rate and spectral efficiency. The new symbol rate, which is 1.2 times higher than the conventional symbol rate, is applied to both the downlink and the uplink and is expected to be reflected in the GERAN standardization.

As described above, conventional GERAN systems adopt GMSK and 8-PSK. In GMSK, the bandwidth of binary data is limited by use of a Gaussian low pass filter and then frequency-modulated at a predetermined divide ratio. Due to the resulting continuous switching between two frequencies, GMSK boasts excellent spectral density and high spurious suppression. 8-PSK maps data to a phase-modulated code of a carrier, increasing frequency efficiency. For an EDGE/Enhanced GPRS (EGPRS) system, nine coding schemes, i.e. Modulation and Coding Scheme-1 (MCS-1) to MCS-9, are defined for Packet Data Traffic CHannels (PDTCHs). In real communications, one of various modulation and coding scheme combinations is selected. GMSK is used for MCS-1 to MCS-4, while 8-PSK is used for MCS-5 to MCS-9. An MCS is selected according to a measured channel quality.

FIG. 1 is a block diagram illustrating a downlink transmitter in a conventional GERAN system.

Referring to FIG. 1, a channel encoder 110 encodes a Radio Link Control (RLC) packet data block (referred to as RLC block) by convolutional coding and punctures the coded data in a predetermined puncturing pattern. An interleaver 120 interleaves the punctured data. For allocating the interleaved data to a physical channel, the interleaved data is provided to a multiplexer 140. RLC/Medium Access Control (MAC) header information, an Uplink State Flag (USF), and a code identifier bit 130 are also provided to the multiplexer 140. The multiplexer 140 distributes the collected data to four normal bursts and allocates each burst to a time slot of a Time Division Multiplex Access (TDMA) frame. A modulator 150 modulates the data of each burst. A training sequence rotator 160 adds a Training Sequence Code (TSC) to the modulated data and rotates the phase of the TSC. The phase-rotated data is provided to a transmitter 170. Additional components needed for transmitting the modulated signal, for example, a digital-to-analog converter will not be described in detail herein.

FIG. 2 is a block diagram illustrating a receiver in the conventional GERAN system.

Referring to FIG. 2, a radio front end 210 receives bursts in time slots through a receive antenna and provides the received data to a training sequence derotator 220 and a buffer and derotator 260. The buffer and derotator 260 buffers and phase-derotates the data. A modulation detector and channel estimator 270 detects a modulation scheme and estimates channel information using the data received from the buffer and derotator 260. The training sequence derotator 220 derotates the phase of the received data in accordance with the operation of the training sequence rotator 160 of the downlink transmitter. An equalizer 230 equalizes and demodulates the phase-derotated data based on the detected modulation scheme and the estimated channel information. A deinterleaver 240 deinterleaves the demodulated data and a channel decoder 250 decodes the deinterleaved data, thus recovering transmitted data.

FIG. 3 illustrates the structure of a normal burst in the conventional GERAN system.

Referring to FIG. 3, for data transmission, a TSC including 26 or 31 symbols is positioned at the center of the normal burst. Eight TSCs are defined in the standard, for actual use for a GSM network and a Mobile Station (MS). One TSC is allocated to each cell. In a receiver, radio channel state information is estimated from the TSC and an equalizer eliminates noise and interference from a received signal based on the channel estimation information. The receiver also measures channel quality or link quality using the TSC and feeds back the channel quality or link quality measurement to a transmitter so that the transmitter can perform Link Quality Control (LQC).

A conventional TSC is composed of codes with excellent cyclic autocorrelation properties. Hence, the conventional TSC has good characteristics when channel estimation is performed on a single channel, neglecting inter-channel interference. However, a cell is designed in a cellular system such that carrier frequencies are reused with a sufficient distance between them, considering CO-Channel Interference (CCI). As the carrier frequencies are reused more often, the CCI increases, significantly affecting the performance of channel estimation and signal detection. In this context, when the CCI is severe in a cellular system such as GSM, the use of joint channel estimation is preferred for accurate channel estimation. In this case, cross-correlation properties between TSCs have a great influence on the performance of the joint channel estimation. Yet, the present GERAN TSCs were designed with no regard to their cross-correlation characteristics. As a consequence, the TSCs degrade system performance under a CCI environment. Moreover, when the conventional TSCs are extended to high-order modulation schemes such as 16-QAM and 32-QAM used in the GERAN evolution system, they may cause the degradation of system performance.

SUMMARY OF THE INVENTION

The present invention has been made to address at least the above problems and/or disadvantages and to provide at least the advantages described below. Accordingly, an aspect of the present invention provides a method for generating a new TSC and a TSC layout to overcome the shortcomings of TSCs used in a conventional GERAN system.

Another aspect of the present invention provides an apparatus for efficiently transmitting and receiving data using a TSC in a GERAN system.

A further aspect of the present invention provides a method for extending a new TSC to 16-QAM and 32-QAM used in a GERAN system.

According to one aspect of the present invention, a method for modulating a TSC in a communication system is provided. Two signal points having the same absolute value and opposite signs are selected from among signal points of a constellation with M signal points. One of the two selected signal points is selected as a signal point to substitute for each symbol of the TSC. The TSC is reconfigured by substituting a sequence corresponding to the selected signal point for the each symbol of the TSC.

According to another aspect of the present invention, a method for generating a TSC in a communication system is provided. A pair of sequences, A and B, is generated having auto-correlation and cross-correlation properties. The TSC is generated by inserting guard sequences Z, each having z zero symbols, in the most significant bits of the sequences A and B.

According to a further aspect of the present invention, an apparatus for transmitting data in a communication system is provided. The apparatus includes an encoder that encodes data, a multiplexer that multiplexes the coded data and one TSC selected from among predetermined stored TSCs in a normal burst, and a modulator that modulates the multiplexed data. The selected TSC has been reconfigured by selecting two signal points having the same absolute value and opposite signs from among signal points of a constellation with M signal points, selecting one of the two selected signal points as a signal point to substitute for each symbol of the TSC and substituting a sequence corresponding to the selected signal point for the each symbol of the TSC.

BRIEF DESCRIPTION OF THE DRAWINGS

The above and other aspects, features and advantages of the present invention will be more apparent from the following detailed description when taken in conjunction with the accompanying drawings, in which:

FIG. 3 is a diagram illustrating the structure of a normal burst in the conventional GERAN system;

Figure 11:
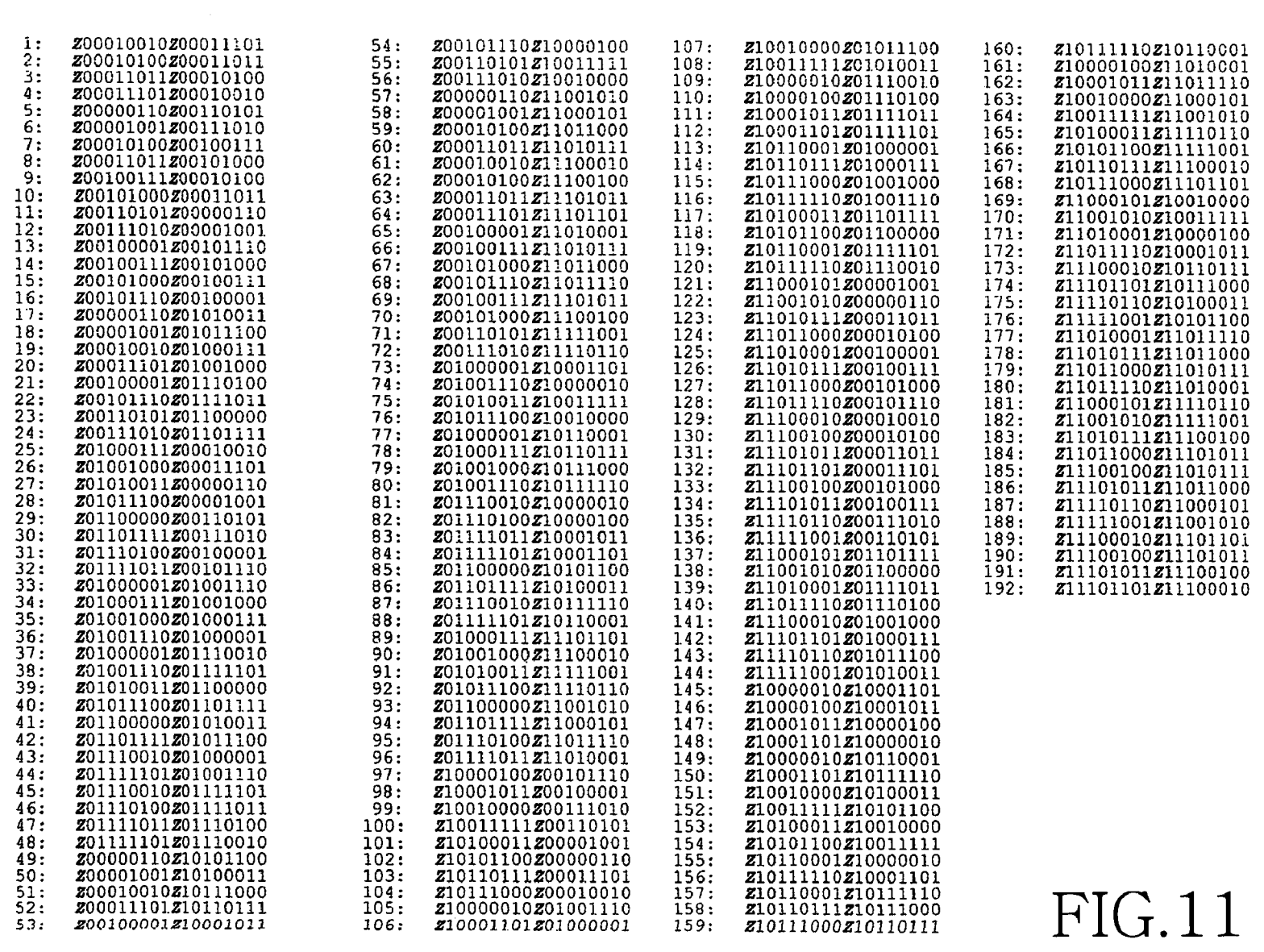

FIG. 11 lists an entire set of TSCs generated from 192 even-shift orthogonal sequences of length 16 or even-shift quasi-complementary sequences of length 16 according to an embodiment of the present invention;

Figure 12:
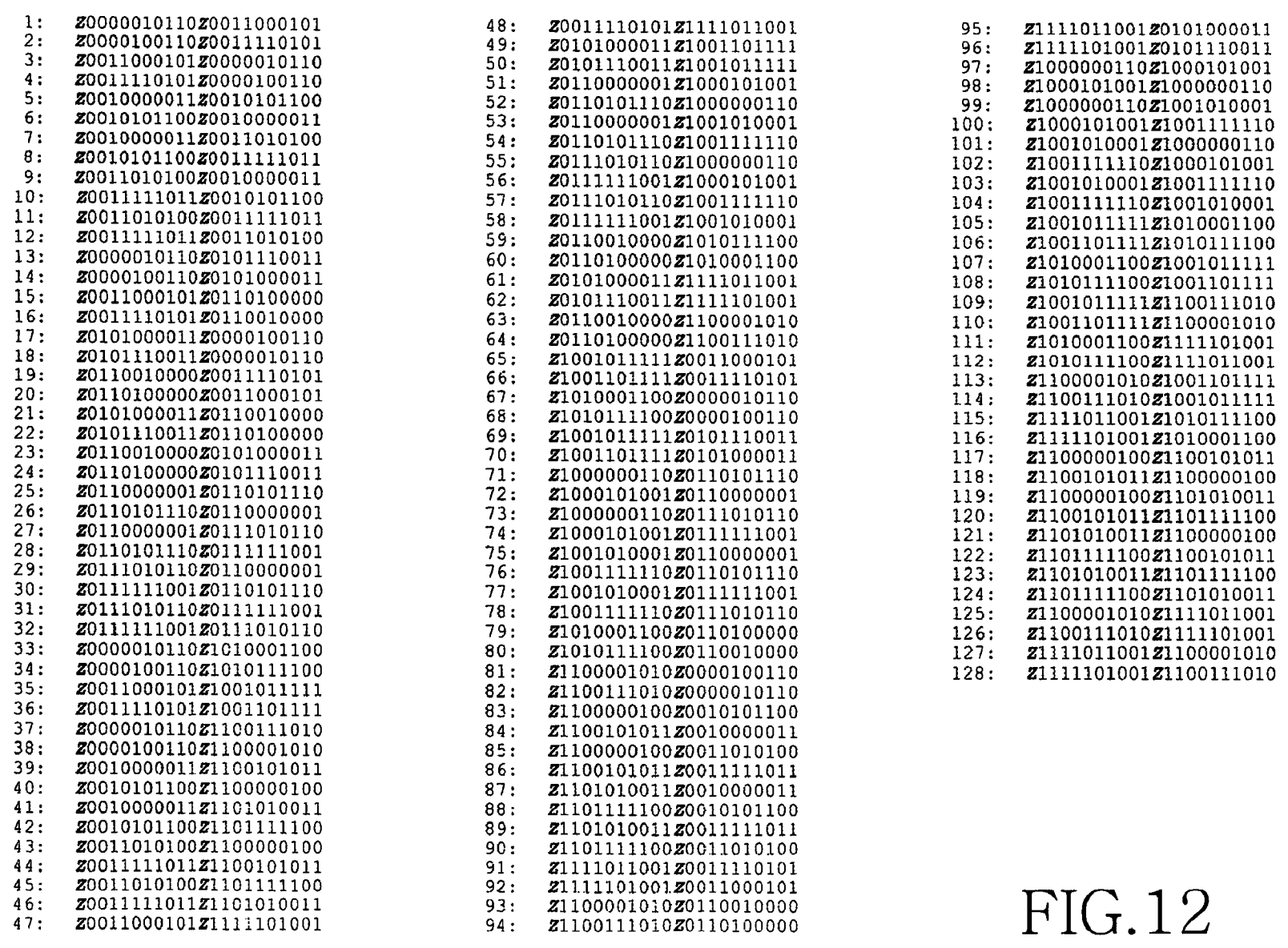

FIG. 12 lists an entire set of TSCs generated from 128 even-shift orthogonal sequences of length 20 or even-shift quasi-complementary sequences of length 20 according to an embodiment of the present invention;

Figure 13:
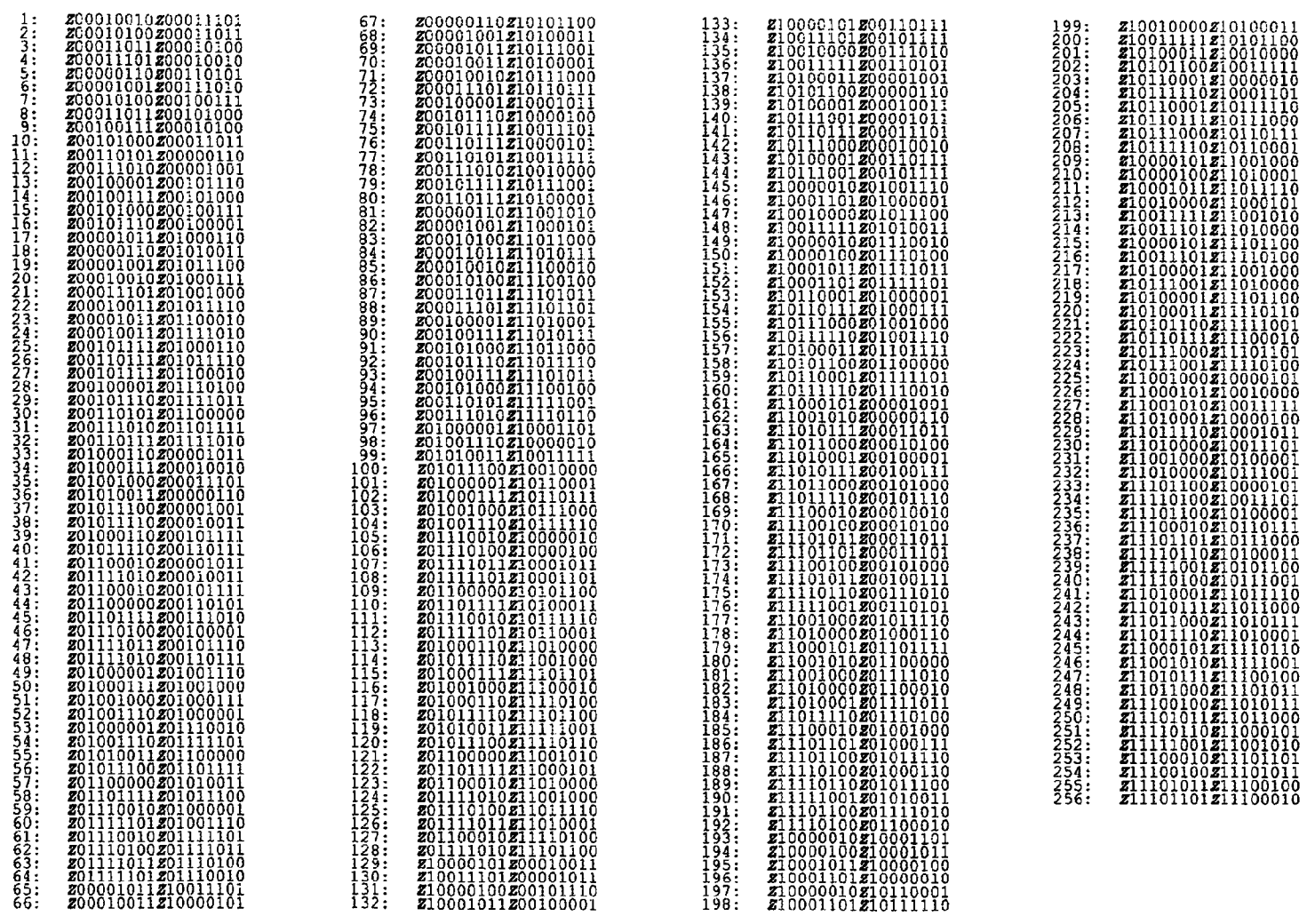

FIG. 13 lists an entire set of TSCs generated from 256 even-shift orthogonal sequences of length 16 or even-shift quasi-complementary sequences of length 16 according to an embodiment of the present invention; and FIGS. 14A to 14D list an entire set of TSCs generated from 832 even-shift orthogonal sequences of length 20 or even-shift quasi-complementary sequences of length 20 according to an embodiment of the present invention

DETAILED DESCRIPTION OF THE PREFERRED EMBODIMENTS

Figure 1:
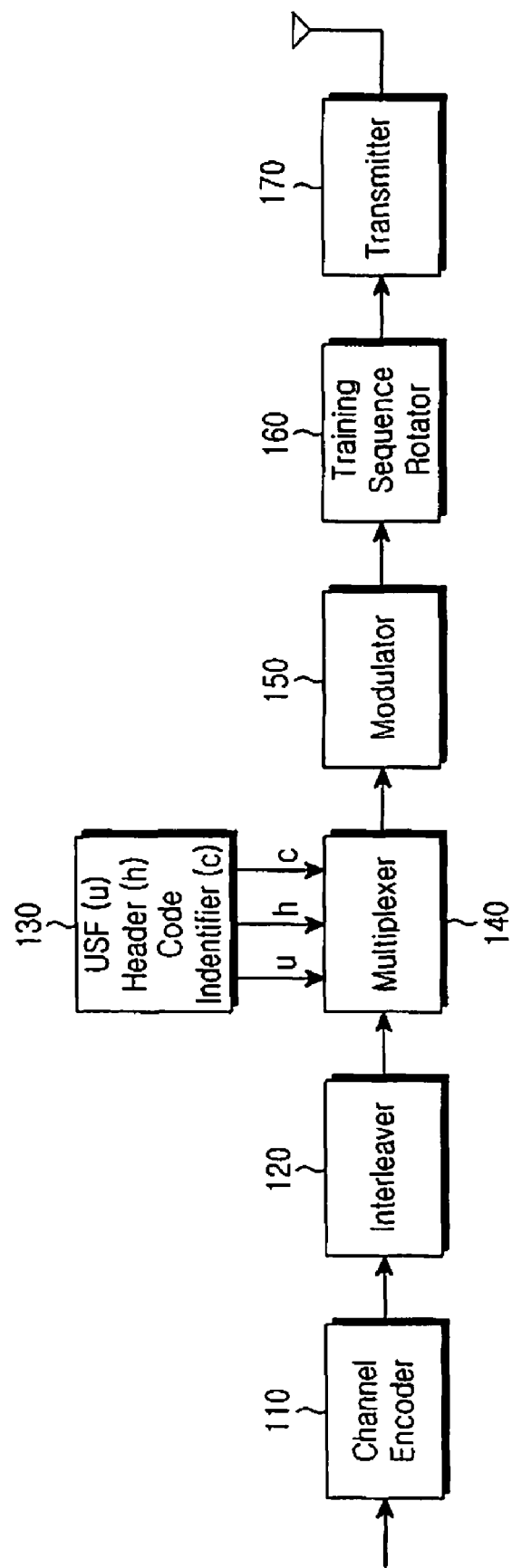
FIG. 1 is a block diagram illustrating a downlink transmitter in a conventional GERAN system.
Figure 2:
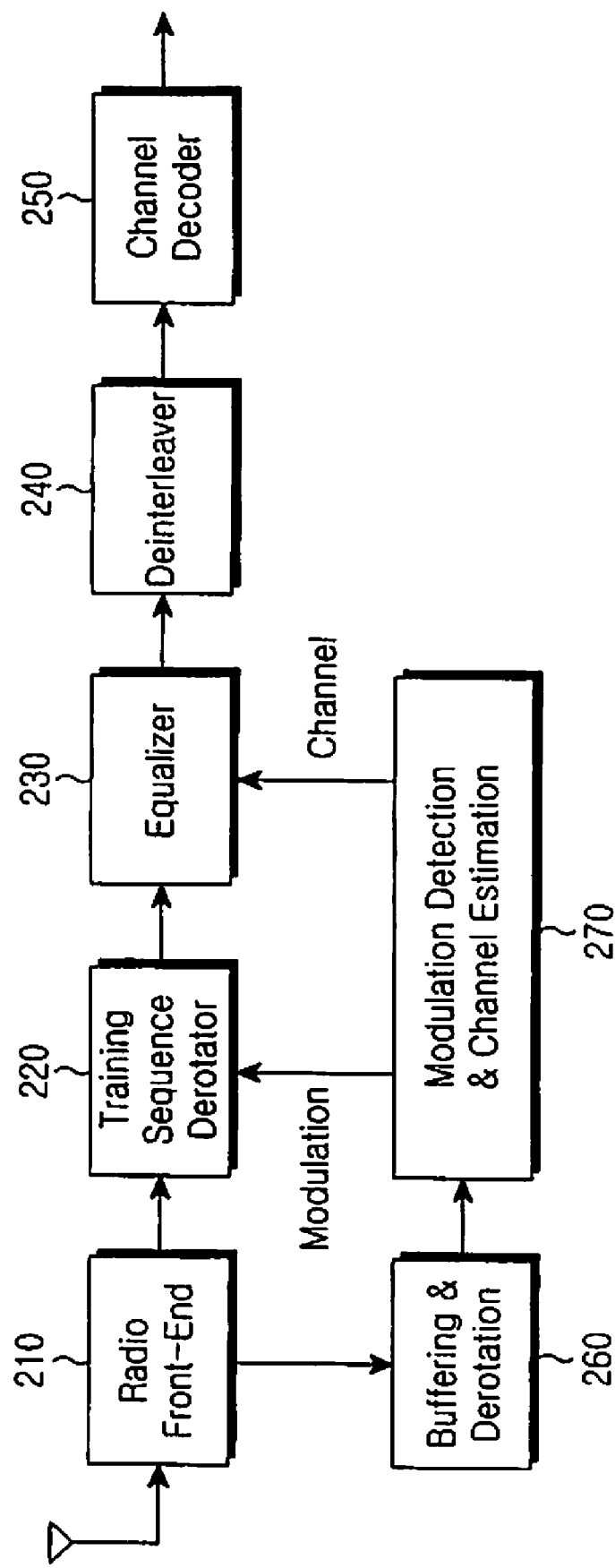
FIG. 2 is a block diagram illustrating a receiver in the conventional GERAN system.

Preferred embodiments of the present invention are described in detail with reference to the accompanying drawings. It should be noted that similar components are designated by similar reference numerals although they are illustrated in different drawings. Detailed descriptions of constructions or processes known in the art may be omitted to avoid obscuring the subject matter of the present invention.

Embodiments of the present invention take into account the auto-correlation properties and cross-correlation properties of a TSC in designing a GERAN system and the TSC for the GERAN system. To search for an appropriate TSC, Golay complementary sequences are used. To evaluate interference between sequences, Signal-to-Noise Ratio (SNR) degradation is introduced as an evaluation criterion. Also, a Min-Max optimization method is used to detect binary TSCs having excellent cross-correlation properties.

In accordance with an embodiment of the present invention, a TSC is designed using Golay complementary sequences or quasi-complementary sequences. A complex-valued sequence of length n, $P=(p_0, p_1, \ldots p_{N-1})$, is defined in Equation (1) as:

$$R_P(k) = \sum_{n=0}^{N-1} p_n p_{n+k}^*, k = 0, \pm 1, \pm 2, \ldots, \pm N - 2 \tag{1}$$

where * denotes a conjugate. That is, $R_P(k)=R_P(-k)$. If binary sequences $A=(a_0, a_1, \ldots, a_{N-1})$ and $B=(b_0, b_1, \ldots, b_{N-1})$ ($a_n, b_n \in \{-1, +1\}$) are Golay complementary sequences of length N, sequences A and B meet Equation (2) below.

$$R_A(k) + R_B(k) = \begin{cases} 0, & k = \pm 1, \pm 2, \ldots, \pm N - 1 \\ 2N, & k = 0 \end{cases} \tag{2}$$

In general, the Golay complementary sequences are of length 4, 8, 16, 20 or 32. If sequences A and B satisfy Equation (3), they are defined as binary quasi-sequences.

$$R_A(k) + R_B(k) = \begin{cases} 0, & k = \pm 1, \pm 2, \ldots, \pm K \\ 2N, & k = 0 \end{cases}, K < N - 2 \qquad (3)$$

Golay complementary sequences and quasi-complementary sequences have excellent auto-correlation properties. Relying on this fact, new TSCs can be designed so that each of the TSCs has a pair of complementary sequences. Let a fading channel impulse response with L taps be denoted by $h=(h_0, h_1 \ldots h_{L-1})$ in designing TSCs. When Golay complementary sequences are used for estimating the L-tap fading channel, the condition that $N \geq L$ should be met. Also, when quasi-complementary sequences are used for estimating the L-tap fading channel, the condition that $K \geq L-1$ should be met.

Figure 4:
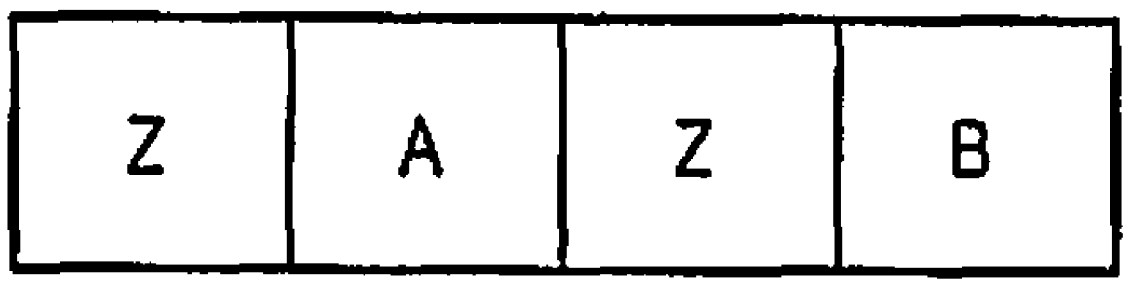
FIG. 4 is a diagram illustrating a TSC structure according to an embodiment of the present invention.

In accordance with an embodiment of the present invention, a TSC is created using a pair of the Golay complementary sequences or quasi-complementary sequences A and B in the TSC structure illustrated in FIG. 4. Referring to FIG. 4, guard sequences Z each having z zero symbols are disposed at the most significant positions of the sequences A and B. The guard sequences Z should be as short as possible, but long enough to cancel Inter-Symbol Interference (ISI) within the TSC or within A and B in the same time slot. That is, the number of symbols in one guard sequence, z, should be greater than or equal to L-1 ($z \geq L-1$).

A sequence X of length N' is defined as a TSC designed using a pair of complementary sequences A and B in the structure of FIG. 4, as shown in Equation (4).

$$y_j = \sum_{i=0}^{L-1} h_i x_{j-i} + n_j, \quad j = 0, 1, \ldots, N-1 \qquad (4)$$

If CCI is not considered when $$X = (\underbrace{0 \ldots 0}_{L-1} a_0, a_1, \ldots, a_{N-1}, \underbrace{0 \ldots 0}_{L-1} b_0, b_1, \ldots b_{N-1}),$$

$$N' = 2(N+L-1),$$

received signal samples at the receiver are expressed as Equation (5).

$$y_j = \sum_{i=0}^{L-1} h_i x_{j-i} + n_j, \quad j = 0, 1, \ldots, N-1 \qquad (5)$$

In the form of a vector the received signal samples at the receiver are expressed as $y = Xh^t + n$. A noise vector $n=(n_0, n_1, \ldots n_{N-1})^t$ and X is an $(N'-L) \times L$ matrix given as follows in Equation (6).

$$X = \begin{pmatrix} x_{L-1} & \cdots & x_1 & x_0 \\ x_L & \cdots & x_2 & x_1 \\ \vdots & \vdots & \vdots & \vdots \\ x_{N'-1} & \cdots & x_{N'-L+1} & x_{N'-L} \end{pmatrix} \qquad (6)$$

Meanwhile, a least-squares error estimation-based channel estimate is shown in Equation (7) below.

$$\hat{h} = (X^t X)^{-1} X^t y \qquad (7)$$

where X' is a conjugate transpose matrix of X and X'X is an L×L auto-correlation matrix expressed as Equation (8) below.

$$\begin{aligned} \Phi &= X'X \\ &= \begin{pmatrix} R_X(0) & R_X(-1) & \cdots & R_X(-L+1) \\ R_X(1) & R_X(0) & \cdots & R_X(-L+2) \\ \vdots & \vdots & & \vdots \\ R_X(L-1) & R_X(L-2) & \cdots & R_X(0) \end{pmatrix} \\ &= \begin{pmatrix} R_A(0)+R_B(0) & R_A(-1)+R_B(-1) & \cdots & R_A(-L+1)+R_B(-L+1) \\ R_A(1)+R_B(1) & R_A(0)+R_B(0) & \cdots & R_A(-L+2)+R_B(-L+2) \\ \vdots & \vdots & & \vdots \\ R_A(L-1)+R_B(L-1) & R_A(L-2)+R_B(L-2) & \cdots & R_A(0)+R_B(0) \end{pmatrix} \end{aligned} \qquad (8)$$

Because the sequences A and B are Golay complementary sequences or quasi-complementary sequences, Equation (8) is reduced to Equation (9) below.

$$\Phi = X'X = \begin{pmatrix} 2N & 0 & \cdots & 0 \\ 0 & 2N & \cdots & 0 \\ \vdots & \vdots & & \vdots \\ 0 & 0 & \cdots & 2N \end{pmatrix}_{6 \times 6} \qquad (9)$$

If the variance of white Gaussian noise is $\sigma^2$, the average squared estimation error is $\sigma^2 tr(\Phi^{-1})$ and the trace value of a matrix $\Phi^{-1}$ should be as small as possible. Constant Amplitude Zero Auto-Correlation (CAZAC) sequences ensure optimal estimation. That is, two matrices $\Phi$ and $\Phi^{-1}$ have diagonal elements. Consequently, by substituting equation (9) into equation (7), the channel estimate is determined by Equation (10) below.

$$\hat{h}_i = \frac{1}{2N} \sum_{j=0}^{N'-L} x_{j+5-i} y_j, \quad i = 0, 1, \ldots, L-1$$

(10)

Let two complex-valued sequences of length N be denoted by $P=(p_0, p_1 \ldots, p_{N-1})$ and $Q=(q_0, q_1, \ldots, q_{N-1})$, respectively. Then a cross-correlation function for the two sequences is defined as Equation (11) below.

$$C_{PQ}(k) = \sum_{n=0}^{N-1} p_n q_{n+k}^*, k = 0, \pm 1, \pm 2, \ldots, \pm N - 2 \quad (11)$$

Another pair of Golay complementary sequences always exists for a pair of Golay complementary sequences. The cross-correlation properties of the two pairs of Golay complementary sequences are mutually complementary. That is, each of two TSCs includes Golay complementary sequences of which the cross-correlation is 0 for any bit shift.

Considering CCI in the joint channel estimation, a received signal associated with TSCs, $X_0, X_1, \ldots, X_{M-1}$, is $y=Xh^t+n$, where n is a white Gaussian noise vector. Herein, $h=(h_0, h_1, \ldots h_{M-1})$ and $X=(X_0, X_1, \ldots, X_{M-1})$. For a $j^{th}$ TSC, $X_j$, $j=0, \ldots, M-1$. Assuming the white Gaussian noise as in the case of single channel estimation, a joint channel estimate is given as $\hat{h}=(X^tX)^{-1}X^ty=\Phi^{-1}X^ty$.

SNR degradation in dB (referred to as SNR–d) can be used as a criterion for evaluating the average squared error of the received signal. SNR–d is used to evaluate the cross-correlation characteristics of TSCs, defined as Equation (12) below.

$$SNR-d=10\cdot\log_{10}(1+tr(\Phi^{-1})) \quad (12)$$

where $tr(\Phi^{-1})$ denotes the sum of main diagonal elements of the matrix $\Phi^{-1}$. As SNR–d is smaller, the cross-correlation properties of TSCs are better.

A method for searching for a pair of complementary sequences will be described below. Regarding Golay complementary sequences, known Golay complementary sequences can be detected by a computer-aided search of an entire sequence set of a short length. That is, an even-shift orthogonal sequence of length 2N is determined solely by a pair of Golay complementary sequences of length N, A and B. Therefore, the Golay complementary sequence pair can be detected in the following steps.

First, an even-shift orthogonal sequence is detected. After the even-numbered symbols and odd-numbered symbols of the even-shift orthogonal sequence are deinterleaved separately, the two deinterleaved sequences are reconstructed.

Similarly, a pair of quasi-complementary binary sequences of length N can be generated by deinterleaving an even-shift quasi-orthogonal sequence of length 2N detected by computer-aided search. The auto-correlation of the even-shift quasi-orthogonal sequence should satisfy $R(k)=0$. ($k=\pm 2, \pm 4, \ldots, \pm 2$. $K<N$).

A set of all possible TSCs can be generated out of an entire set of Golay complementary sequences according to the TSC structure of FIG. 4.

Figure 5:
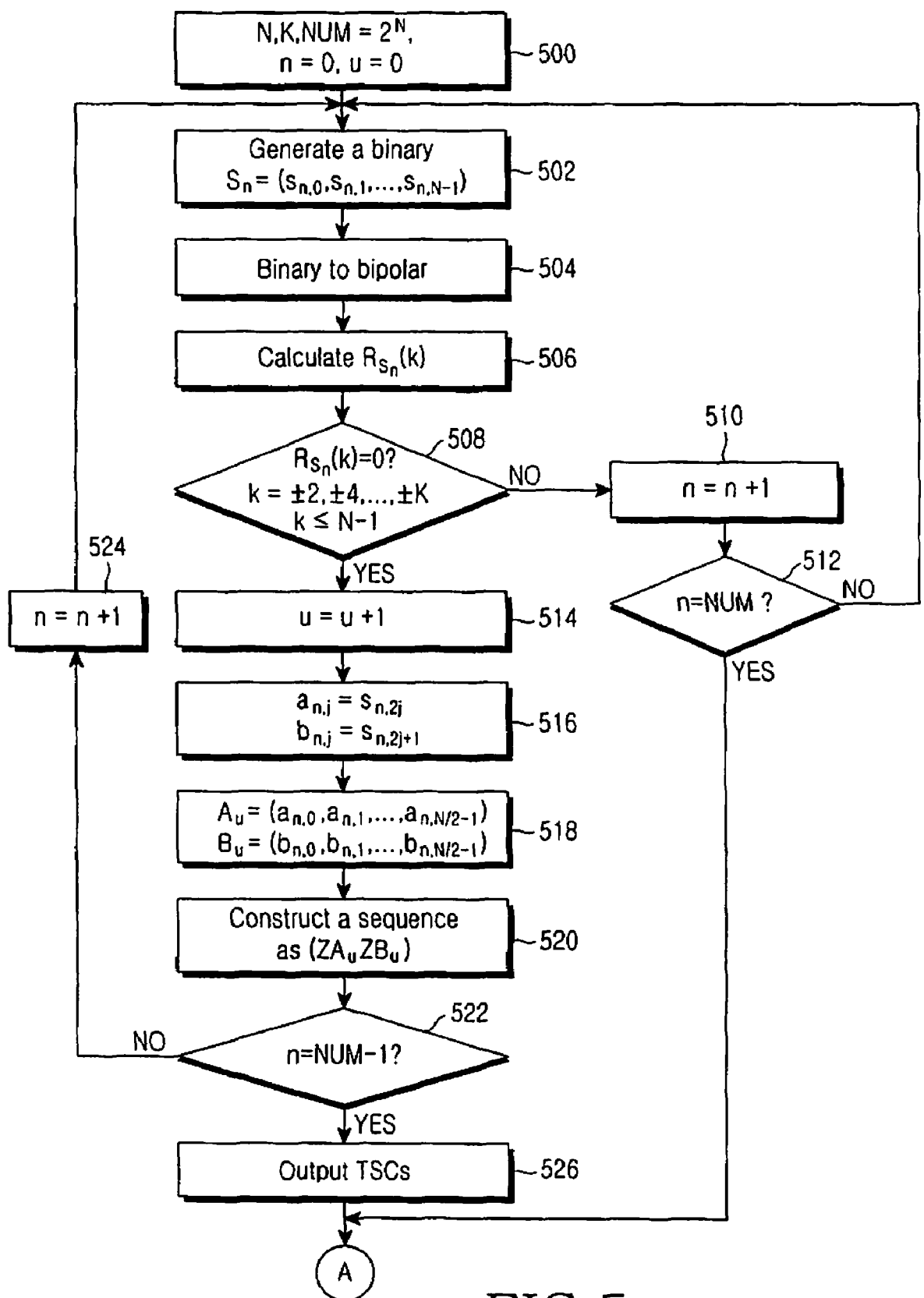
FIG. 5 is a flowchart illustrating an operation for generating TSCs according to an embodiment of the present invention.

FIG. 5 is a flowchart illustrating an operation for generating an entire TSC set according to an embodiment of the present invention.

Referring to FIG. 5, a variable N, indicating a binary sequence, and a parameter K are set to initial values in step 500. In step 502, a binary sequence of length N, $S_n$, is generated. After the binary signal is mapped to the bipolar signal in step 504, the auto-correlation function $R_{S_n}(k)$ of the bipolar sequence $S_n$ is calculated in step 506. In step 508, even-shift auto-correlations $R_{S_n}(k)$ are evaluated. If every auto-correlation does not satisfy $R_{S_n}(k)=0$, a sequence index n is increased in step 510 and it is determined whether the sequence index n is a maximum sequence index (NUM) in step 512. If the sequence index is the maximum sequence index (n=NUM), an entire TSC set is output in step 526. If the sequence index is not the maximum sequence index, the procedure returns to step 502 to generate a binary sequence $S_n$.

On the other hand, if $R_{S_n}(k)=0$ in step 508, a complementary sequence u is increased in step 514 and the sequence $S_n$ is divided into sequences $A_u$ and $B_u$ according to odd-numbered and even-numbered symbol positions in step 516 and 518. In step 520, a TSC is generated using $A_u$ and $B_u$ in the form of Z, $A_u$, Z, $B_u$ according to the TSC structure illustrated in FIG. 4. It is determined from the index n whether every binary sequence has been evaluated in step 522. If there is any remaining binary sequence, the sequence index n is increased in step 524 and the procedure returns to step 502, for sequence generation. If every binary sequence has been evaluated, an entire TSC set is output in step 526.

Figure 14A:
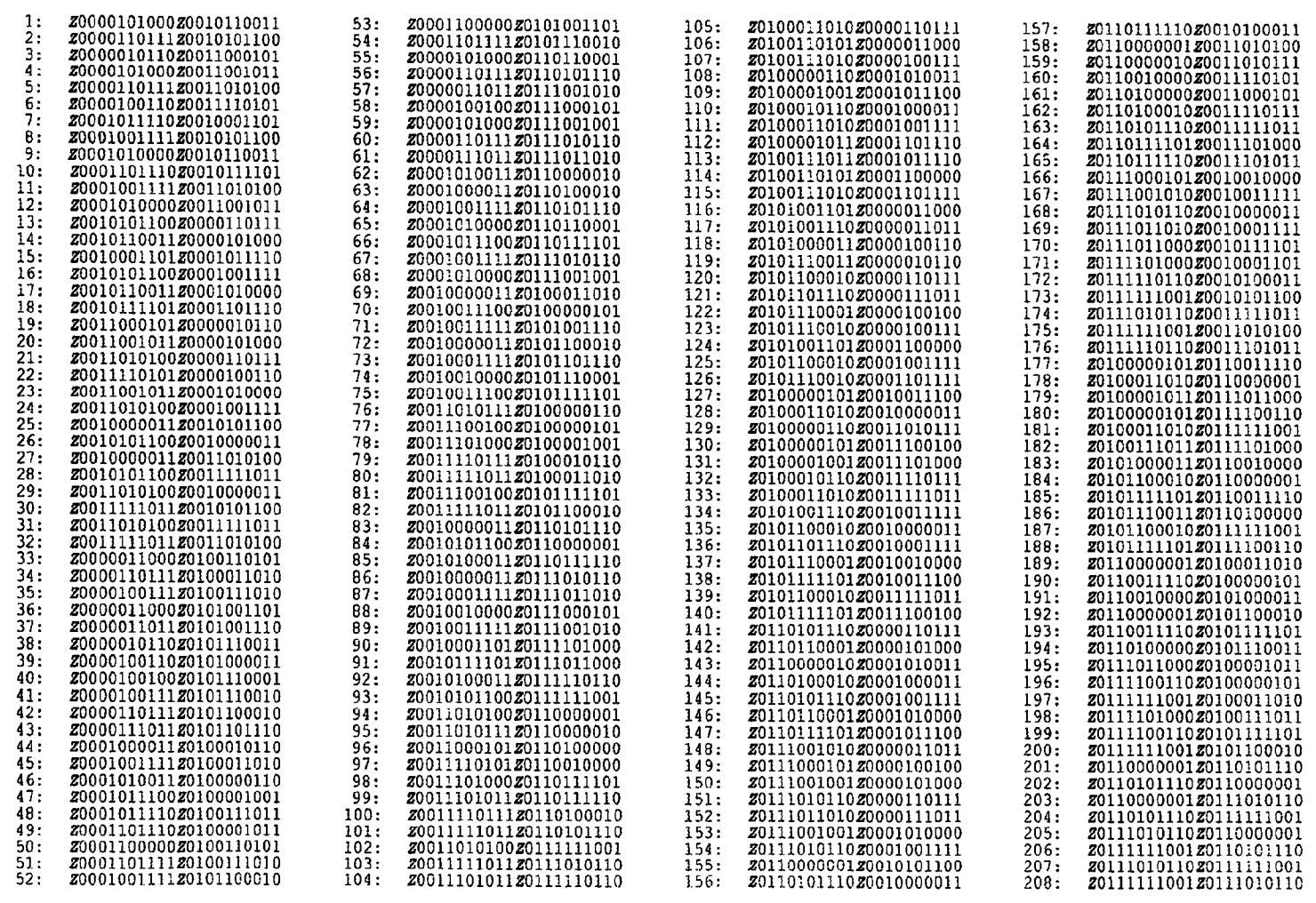
Figure 14B:
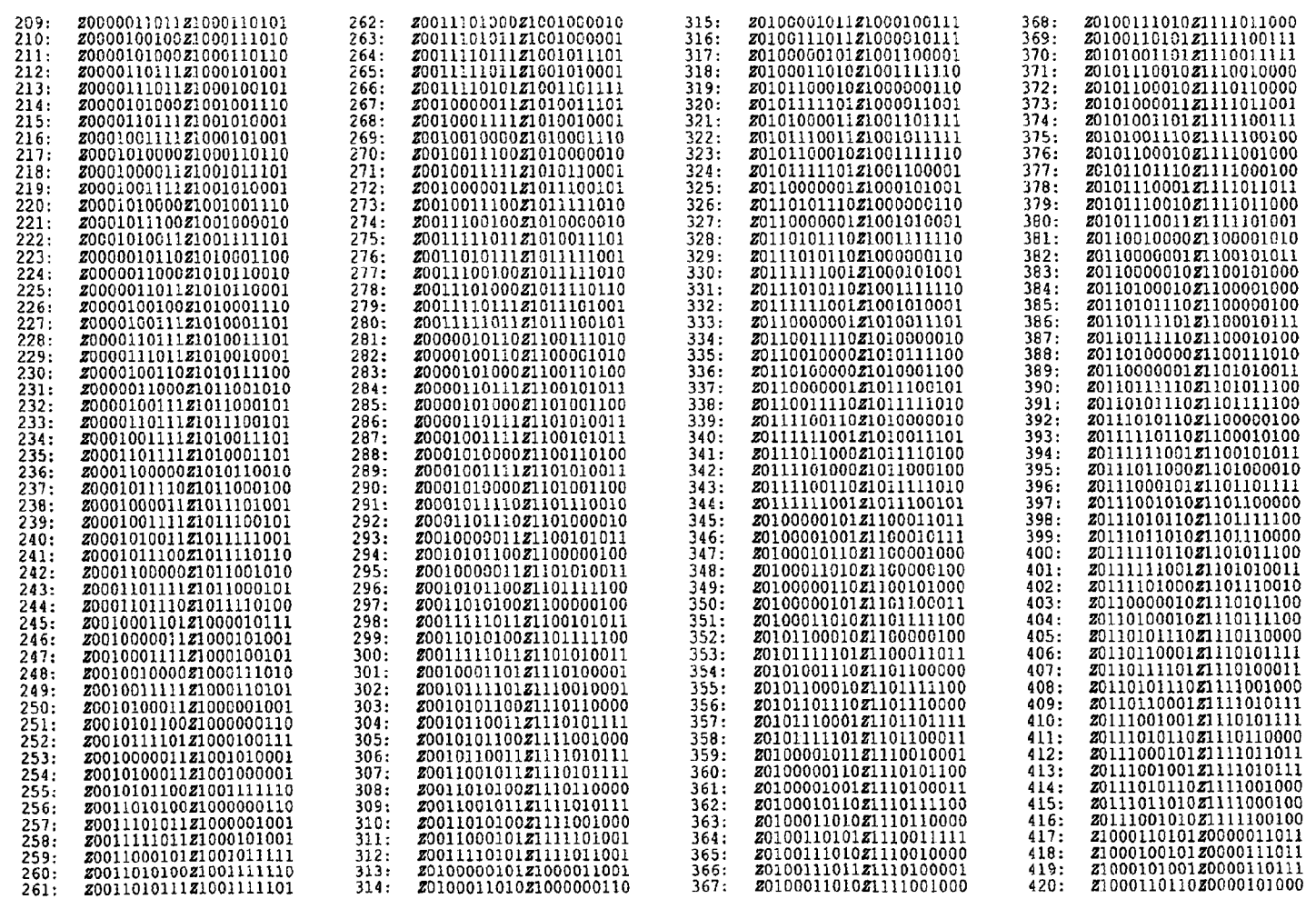
Figure 14C:
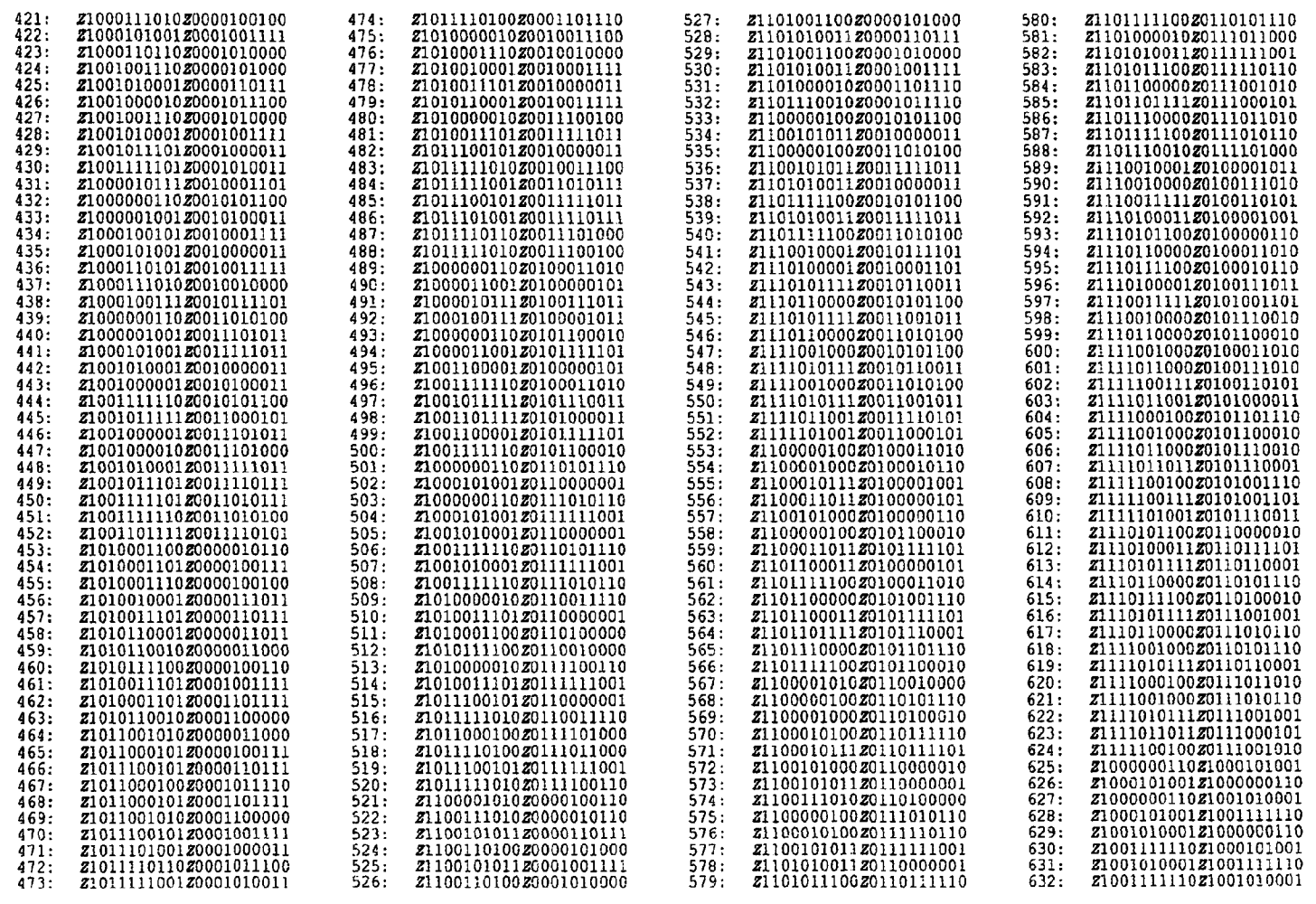
Figure 14D:
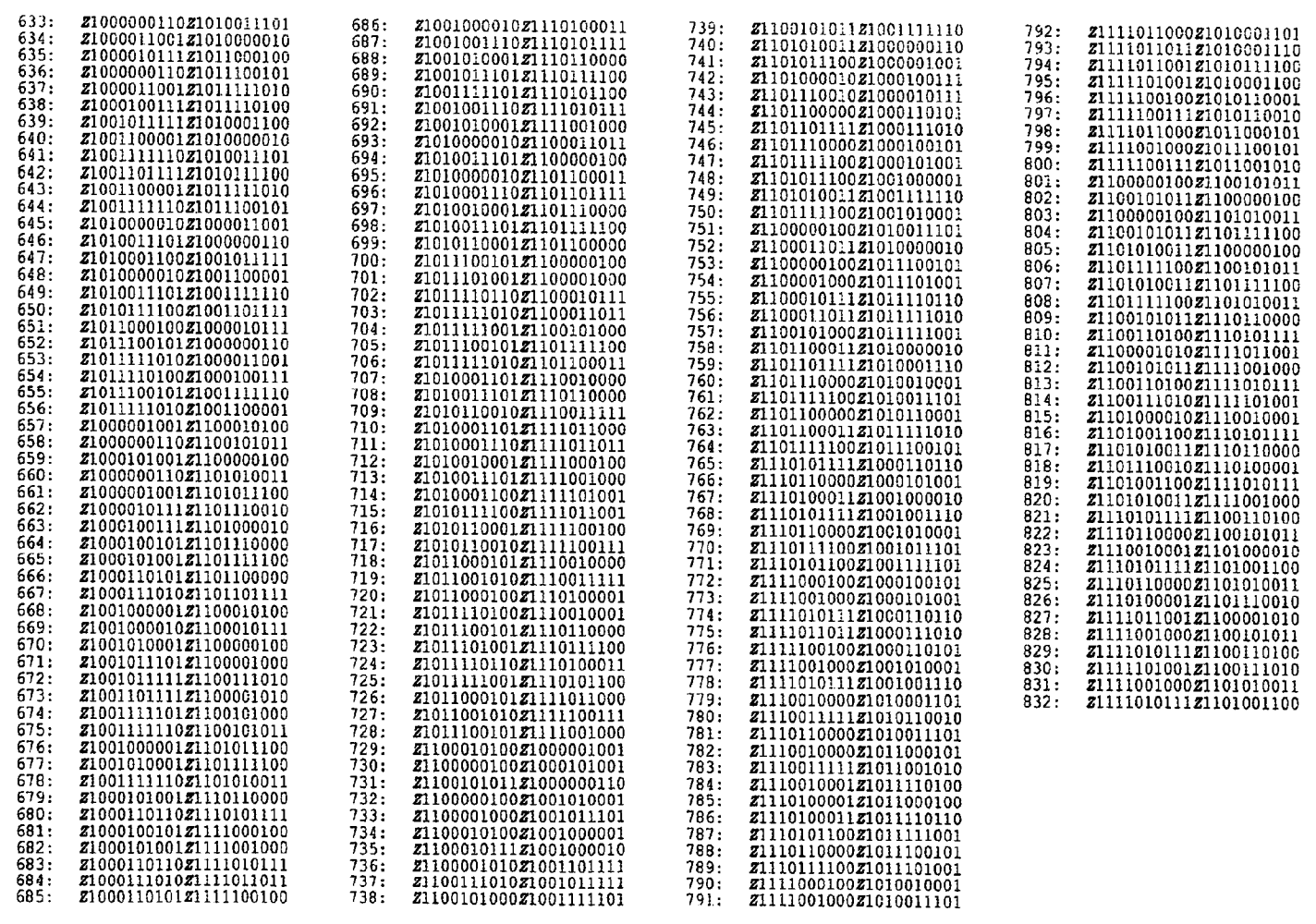

FIGS. 11 to 14D illustrate entire sets of sequences generated from two types of sequences of lengths 16 and 20, respectively, i.e. even-shift orthogonal sequences and even-shift quasi-complementary sequences, when K=5. Logic '1' and logic '0' are expressed as '1' and '−1' in the binary sequences.

Intended TSCs can be detected from the entire TSC sets illustrated in FIGS. 11 to 14D using correlation properties. For example, since the GERAN system uses eight different TSCs, a TSC set with excellent auto-correlation and cross-correlation properties can be elected from an entire TSC set. To do so, a sequence subset is formed out of the entire TSC set and the cross-correlation function should be optimized using the sequence subset. Also, the maximum SNR degradation value should be minimized between sequences in the selected TSC subset. This process is performed by a Min-Max optimization algorithm. For example, cross-correlation properties can be optimized for half of the entire TSC based on the property that sequences X and −X have the same auto-correlation function.

Figure 6:
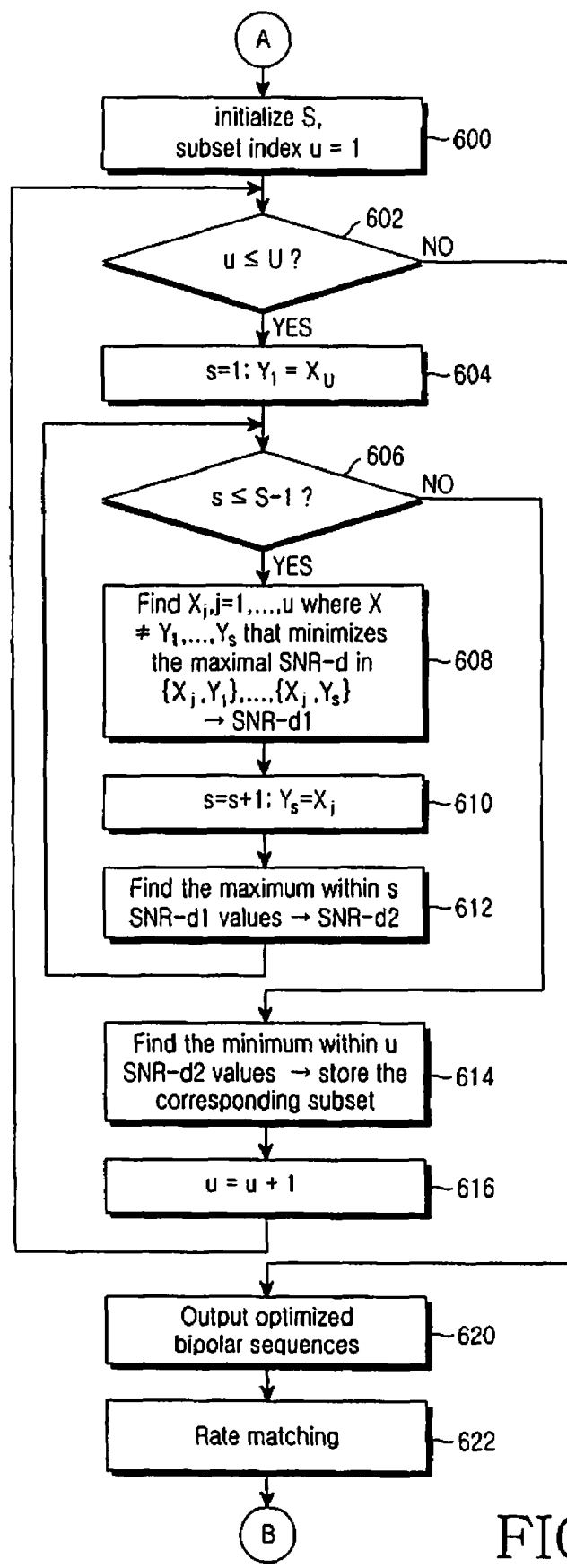
FIG. 6 is a flowchart illustrating an operation for performing Min-Max optimization on TSCs according to an embodiment of the present invention.
Figure 7:
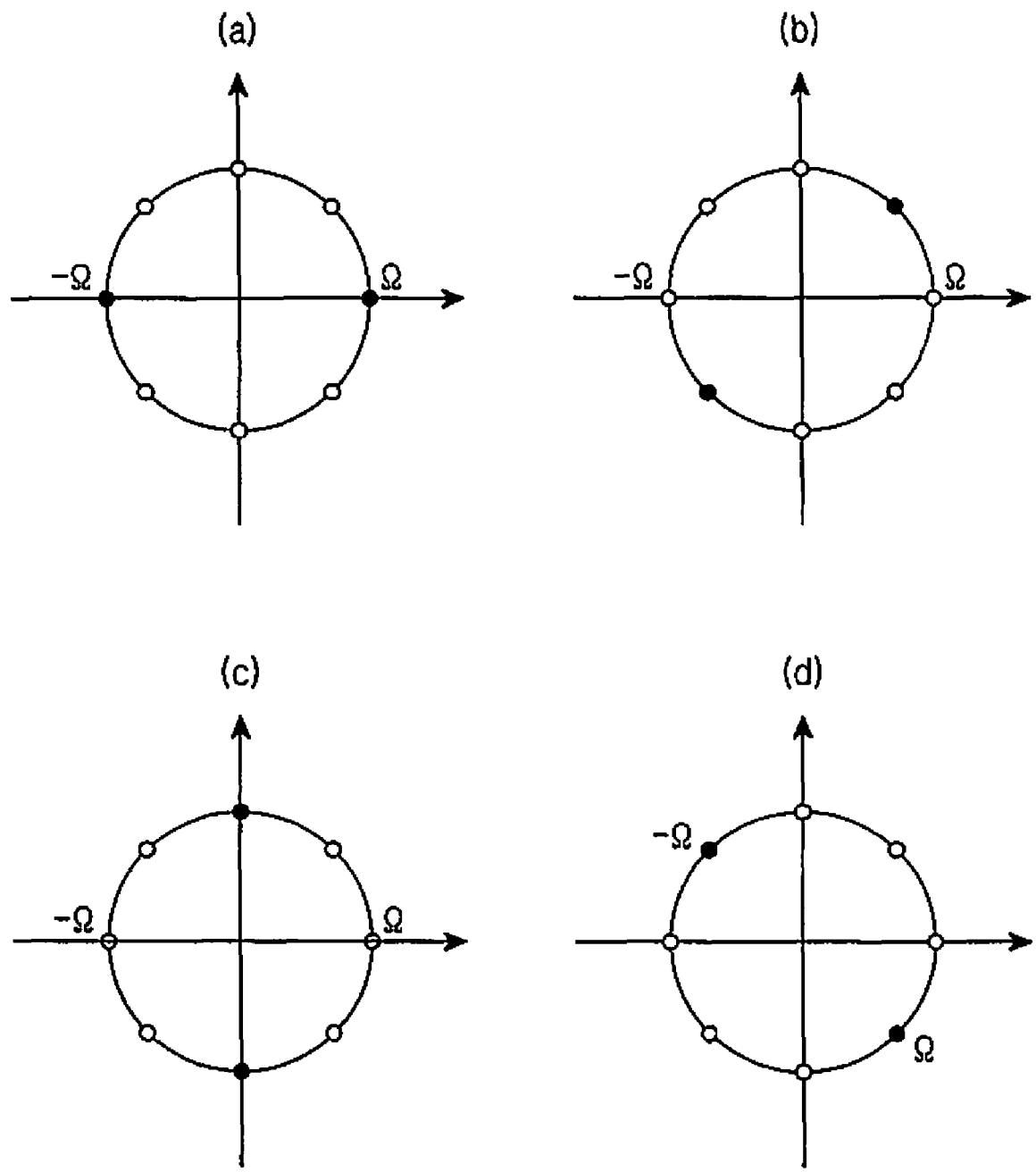
FIGS. 7A to 7D are diagrams illustrating a selection of constellation points in 8-PSK for extended use of a TSC of an embodiment of the present invention.

FIG. 6 is a flowchart illustrating an operation for performing Min-Max optimization on TSCs according to an embodiment of the present invention.

Let an entire TSC set and a selected TSC subset be denoted by $\{X_1, X_2, \ldots, X_U\}$ and $\{Y_1, Y_2, \ldots, Y_S\}(S \leq U)$. Then, optimization is performed by cross-correlation function evaluation. Referring to FIG. 6, a variable indicating a TSC subset size, S, and a variable indicating a TSC index, u, in the entire TSC set are set to initial values, respectively in step 600. If $u \leq U$ in step 602, subset index s is set to initial values and initial sequence in subset is set to $Y_1=X_u$ in step 604. It is determined whether a TSC index s in the TSC subset is equal to or less than S−1 ($s \leq S-1$) in step 606. If $s \leq S-1$, SNR–d is evaluated and stored as SNR–d1 in step 608. After the TSC index s in the TSC subset is increased in step 610, SNR–d is evaluated and the maximum of SNR–d1 values is stored as SNR–d2 in step 612. Then the procedure returns to step 606.

If the condition that $s \leq S-1$ is not satisfied in step 606, the stored SNR–d2 values are evaluated, the minimum of the SNR–d2 values is detected, and a TSC subset corresponding to the minimum SNR–d2 value is stored in step 614. After the TSC index u in the entire TSC set is increased in step 616, the procedure returns to step 602. If every bipolar TSC of the entire TSC set has been evaluated, that is, the condition that $u \leq U$ is not satisfied in step 602, an optimized subset of bipolar sequences is output in step 620 and subject to rate matching in step 622.

A method for detecting an optimized TSC subset will be described in embodiments of the present invention. While the optimized TSC subset detection will be described in the context of a TSC subset with eight different TSCs each having 26 symbols, the present invention is not limited to this case.

(1) A TSC subset optimized based on Golay complementary sequences is {17, 18, 23, 24, 27, 28, 29, 30}. The numerals of the elements in the TSC subset denote TSC indexes in the TSC list illustrated in FIG. 11. The best and worst SNR–d values of this optimized TSC subset are 2.43 dB and 3.52 dB, respectively.

(2) A TSC subset optimized based on quasi-complementary sequences is {5, 25, 26, 41, 42, 55, 89, 106}. The numerals of the elements in the TSC subset denote TSC indexes in the TSC list illustrated in FIG. 13. The best and worst SNR–d values of this optimized TSC subset are 2.43 dB and 3.40 dB, respectively.

While the application of a TSC formatted as illustrated in FIG. 4 to a higher-order modulation scheme will be described, the present invention is not limited to this application and thus the present invention is applicable to TSCs in other formats.

A new binary TSC detected according to an embodiment of the present invention can be applied to a higher-order M-ary modulation scheme such as 8-PSK, 16-QAM, and 32-QAM used for the GERAN system. Assuming that sequences A and B are generated using {1, −1} for a TSC according to the embodiment of the present invention, the TSC is extended to a TSC for a high-order M-ary modulation scheme in the following procedure.

Step 1: The symbols 1s and −1s of the two sequences A and B forming one TSC in the structure of FIG. 4 are replaced by complex values Ωs and −Ωs corresponding to two constellation points on the constellation of the M-ary modulation scheme. 0 can be one of the M constellation points on the constellation of the M-ary modulation scheme and Ω and −Ω have the same absolute value but opposite signs.

Step 2: Sequences α and β corresponding to the sequences A and B are generated using Ω and −Ω for the M-ary modulation scheme.

Step 3: A TSC is formed using the sequences α and β according to the structure of FIG. 4.

For reference, if c=|Ω|=|−Ω|, the sequences A and B and α and β are placed in the following auto-correlation and cross-correlation relationship for any available shift k, as shown in Equation (13):

$$R_\alpha(k) = c \cdot R_A(k), R_\beta(k) = c \cdot R_B(k), C_{\alpha\beta}(k) = c \cdot C_{AB}(k) \quad (13)$$

Each symbol of the complex-valued TSC is one of the two constellation points selected from the M-ary constellation, as described above. The two constellation points are opposite-signed but have the same energy. Therefore, to achieve a high SNR, it is preferable to select constellation points having a high symbol energy |Ω| in the TSC.

Selection of constellation points for M-ary modulation schemes, 8-PSK, 16-QAM and 32-QAM in the GERAN system according to the above-described method are described in embodiments of the present invention. The constellation point selection method of the present invention can be extended to other higher-order M-ary modulation schemes as well as the three modulation schemes.

FIGS. 7A to 7D are diagrams illustrating a selection of constellation points in 8-PSK for extended use of a TSC of the present invention.

Referring to FIGS. 7A to 7D, two complex signals (or constellation points) having the same phase at opposite positions do not change the auto-correlation and cross-correlation of the TSC.

Figure 8:
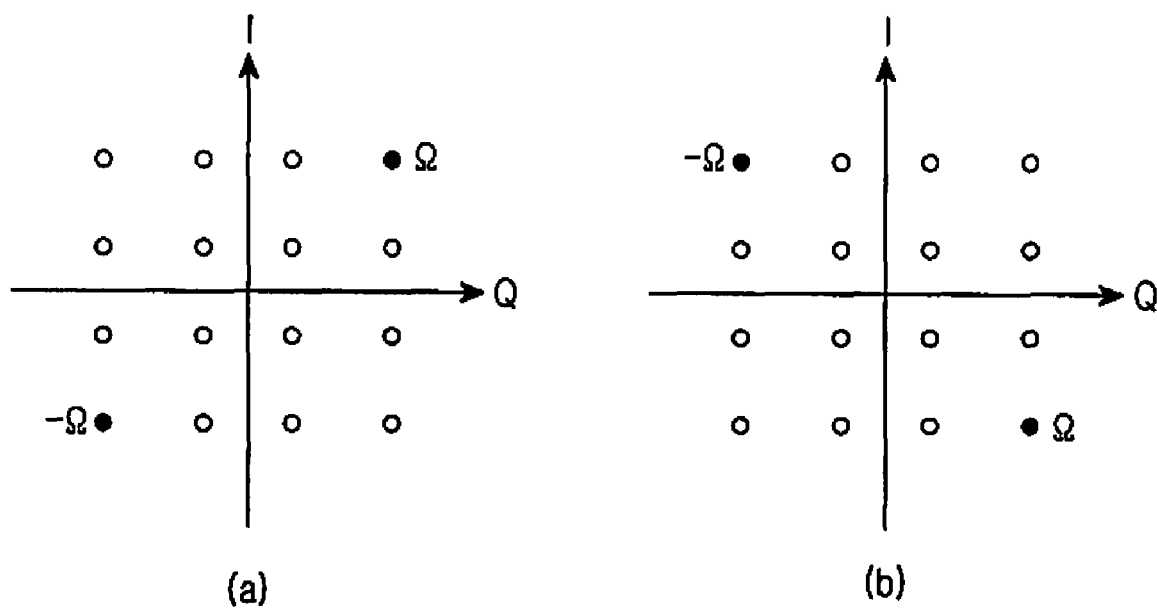
FIGS. 8A and 8B are diagrams illustrating a selection of constellation points in 16-QAM for extended use of a TSC of an embodiment of the present invention.
Figure 9:
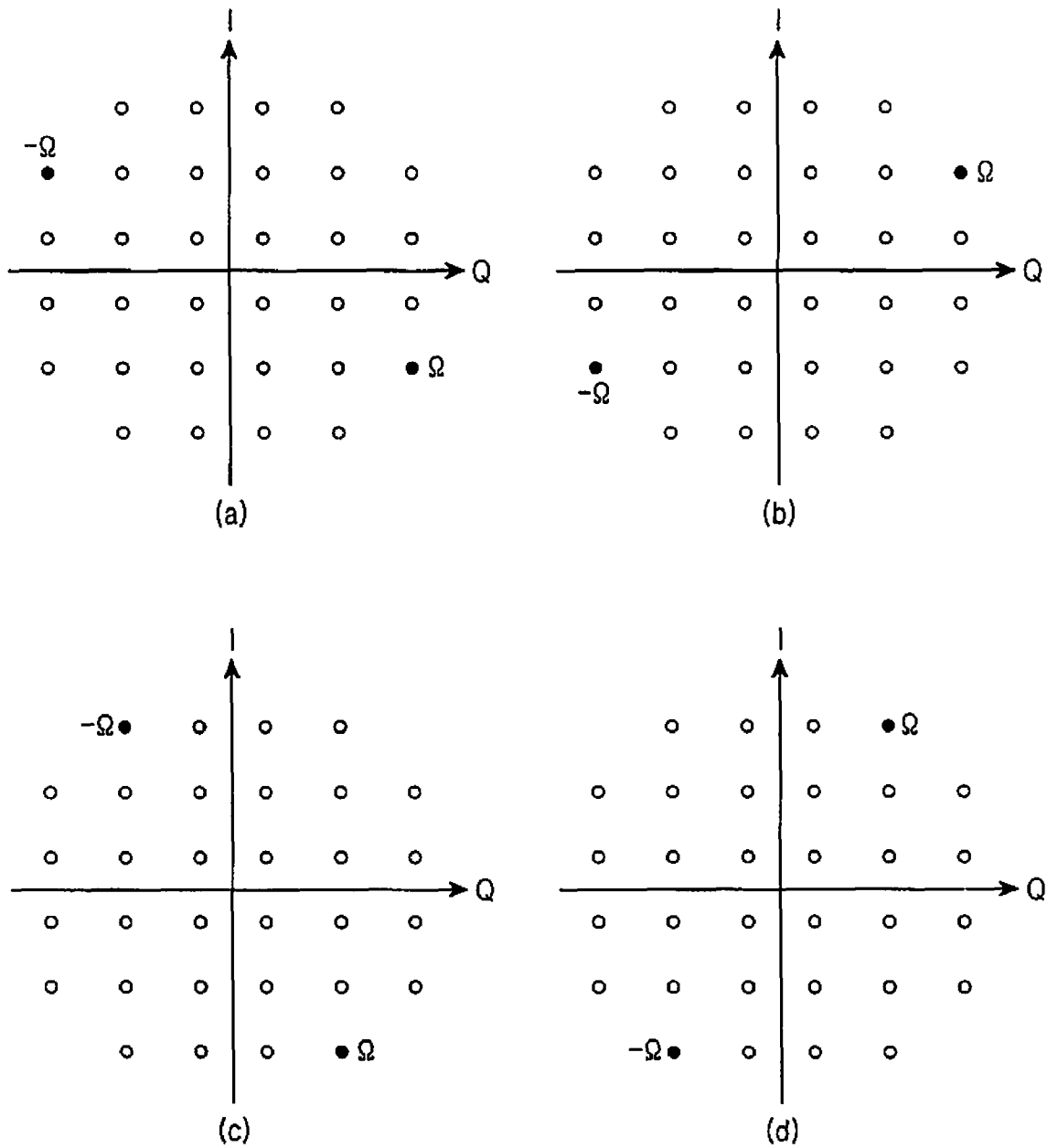
FIGS. 9A to 9D are diagrams illustrating a selection of constellation points in 32-QAM for extended use of a TSC of an embodiment of the present invention.

FIGS. 8A and 8B are diagrams illustrating a selection of constellation points in 16-QAM for extended use of a TSC of the present invention.

Referring to FIGS. 8A and 8B, two complex signals (or constellation points) having the same phase at opposite positions do not change the auto-correlation and cross-correlation of the TSC. While only two cases are illustrated in FIGS. 8A and 8B, other symmetrical constellation points can be taken.

FIGS. 9A to 9D are diagrams illustrating a selection of constellation points in 32-QAM for extended use of a TSC of the present invention.

Referring to FIGS. 9A to 9D, two complex signals (or constellation points) having the same phase at opposite positions do not change the auto-correlation and cross-correlation of the TSC. While only four cases are illustrated in FIGS. 9A to 9D, other symmetrical constellation points can be taken.

Figure 10:
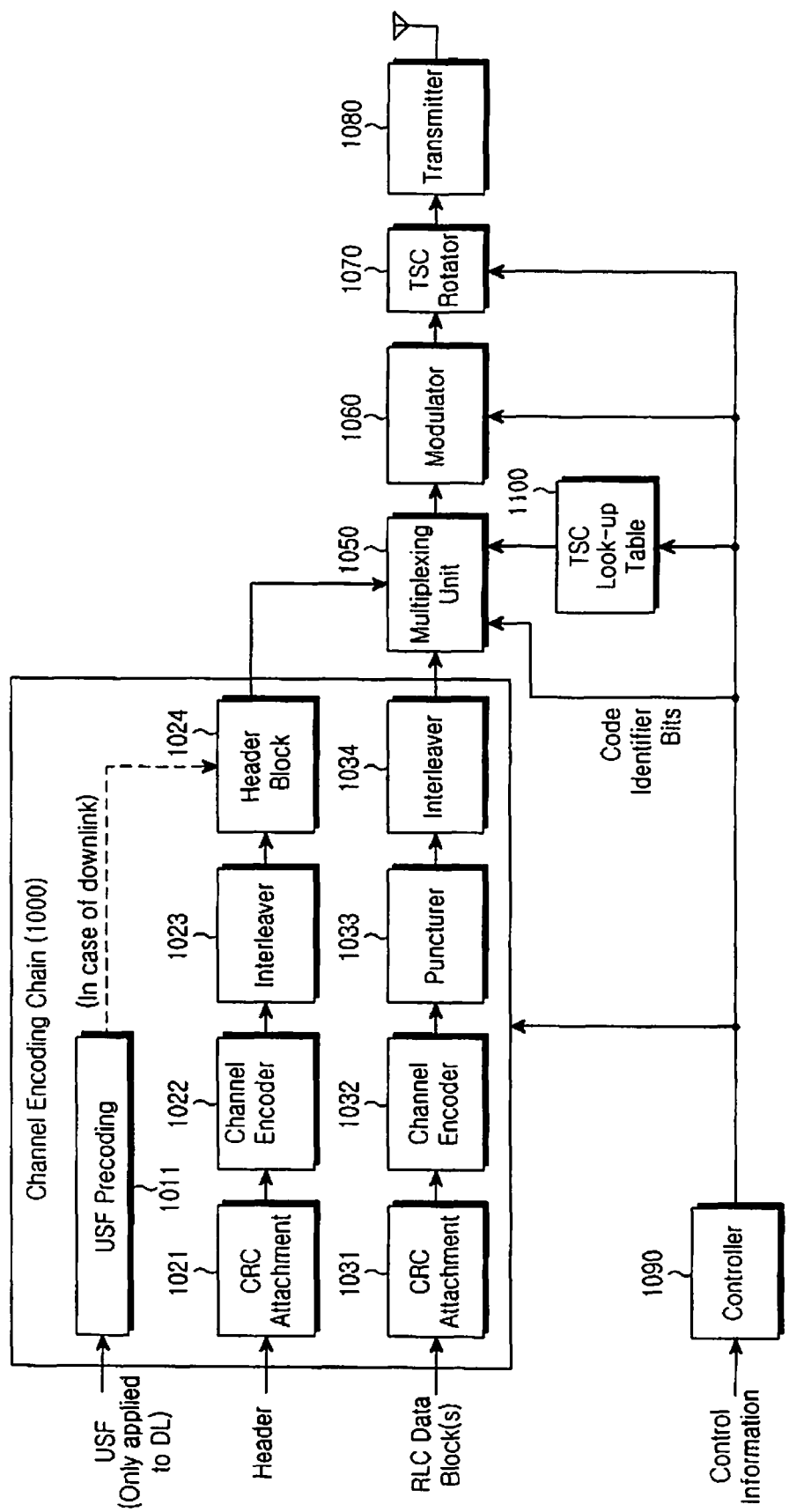
FIG. 10 is a block diagram illustrating a transmission apparatus in a GERAN system adopting an MCS for the downlink and the uplink by use of a TSC according to an embodiment of the present invention.

FIG. 10 is a block diagram illustrating a transmission apparatus in a GERAN system adopting an MCS for the downlink and the uplink by use of a TSC according to an embodiment of the present invention.

Referring to FIG. 10, a Cyclic Redundancy Check (CRC) adder 1031 adds a CRC to an RLC data block. A channel encoder 1032 channel-encodes the CRC-added data. The channel encoder 1032 can be a Convolutional Coder (CC) or a Turbo Coder (TC) depending on a used MCS. A puncturer 1033 punctures and rate-matches the coded data. An interleaver 1034 interleaves the punctured and rate-matched data.

A CRC adder 1021 adds a CRC to RLC/MAC header information. A channel encoder 1022 encodes the CRC-added RLC/MAC header information and punctures the coded information. In general, the channel encoder 1022 that encodes the header information is a CC. An interleaver 1023 interleaves the punctured RLC/MAC header information.

Compared to the uplink, USF bits are transmitted on the downlink. A precoder 1011 precodes the USF information in a predetermined method. A header block 1024 collects the pre-coded USF information and the interleaved RLC/MAC header information and provides the collected information to a multiplexer 1050. For reference, the total number of bits of the header information and the USF information associated with each MCS method on the downlink is equal to that of channel-encoded and punctured data on the uplink. That is, the downlink uses the same channel encoding method as the uplink but has different header information and a different puncturing pattern from those of the uplink.

The multiplexer 1050 receives the RLC data information, the header information (including the USF information for the downlink), a predetermined TSC, and code identifier bits from a channel encoding chain 1000. A TSC look-up table block 1100 stores a TSC set for each modulation scheme (GMSK/8-PSK/16-QAM/32-QAM) in the form of a look-up table in a memory. The look-up table block 1100 notifies the multiplexer 1050 of a modulation scheme and provides a TSC of the present invention according to a control signal received from a controller 1090. The multiplexer 1050 distributes the received information to four normal bursts and allocates them to TDMA time slots of a physical channel. A modulator 1060 modulates the allocated data in a predetermined one of the four modulation schemes GMSK, 8-PSK, 16-QAM and 32-QAM. TSCs in the demodulated data bursts are phase-rotated in a phase rotator 1070 so that a receiver can detect the modulation scheme, and transmitted through a transmitter 1080.

In the above configuration, the controller 1090 controls all blocks, information selection, selection of code identifier bits, a modulation scheme, a TSC, and a phase rotation angle. The controller 1090 receives control information from a network.

As is apparent from the above description, the present invention advantageously enables efficient data transmission and reception without performance degradation in a GERAN system by providing TSCs taking into account their cross-correlation properties. Also, the TSCs can be extended to 16-QAM and 32-QAM used in the GERAN system.

While the invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method for transmitting data in a communication system, comprising the steps of:
    encoding data;
    multiplexing the encoded data and a Training Sequence Code (TSC);
    modulating the multiplexed data using a determined modulation scheme; and
    transmitting the modulated data,
    wherein the encoded data is modulated based on all constellation points of a constellation according to the determined modulation scheme, and the TSC is modulated based on two constellation points having a largest absolute value and opposite signs among M constellation points of the constellation according to the determined modulation scheme.

2. The method of claim 1, further comprising:
    segmenting the encoded data into four bursts.

3. The method of claim 2, wherein the TSC is mapped onto a center of each burst and the encoded data is mapped onto both sides of the TSC.

4. The method of claim 3, wherein each burst is mapped onto a time slot.

5. The method of claim 1, wherein the determined modulation scheme includes at least one of 16QAM and 32QAM.

6. An apparatus for transmitting data in a communication system, the apparatus comprising:
    an encoder for encoding data;
    a multiplexer for multiplexing the encoded data and a Training Sequence Code (TSC);
    a modulator for modulating the multiplexed data using a determined modulation scheme; and
    a transmitter for transmitting the modulated data,
    wherein the modulator modulates the encoded data based on all constellation points of a constellation according to the determined modulation scheme, and modulates the TSC based on two constellation points having largest absolute value and opposite signs among M constellation points of the constellation according to the determined modulation scheme.

7. The apparatus of claim 6, wherein the multiplexer segments the encoded data into four bursts.

8. The apparatus of claim 7, wherein the multiplexer maps the TSC onto a center of each burst and the encoded data onto both sides of the TSC.

9. The apparatus of claim 8, wherein each burst is mapped onto a time slot.

10. The apparatus of claim 6, wherein the determined modulation scheme includes at least one of 16QAM and 32QAM.

11. A method for receiving data in a communication system, comprising steps of:
    receiving modulated data and a modulated Training Sequence Code (TSC);
    demodulating the modulated data based on all constellation points of a constellation according to a determined modulation scheme, and demodulating the TSC based on two constellation points having largest absolute value and opposite signs among M constellation points of the constellation according to the determined modulation scheme; and
    decoding the demodulated data.

12. The method of claim 11, wherein the modulated data and the modulated TSC is received on one burst of four bursts segmented from encoded data.

13. The method of claim 12, wherein the TSC is mapped onto a center of each burst and the encoded data is mapped onto both sides of the TSC.

14. The method of claim 13, wherein each burst is mapped onto a time slot.

15. The method of claim 11, wherein the determined modulation scheme includes at least one of 16QAM and 32QAM.

16. An apparatus for receiving data in a communication system, the apparatus comprising:
    a receiver for receiving modulated data and a modulated Training Sequence Code (TSC);
    a demodulator for demodulating the modulated data based on all constellation points of a constellation according to a determined modulation scheme, and demodulating the TSC based on two constellation points having largest absolute value and opposite signs among M constellation points of the constellation according to the determined modulation scheme; and
    a decoder for decoding demodulated data.

17. The apparatus of claim 16, wherein the receiver receives the modulated data and the modulated TSC on one burst of four bursts segmented from encoded data.

18. The apparatus of claim 17, wherein the TSC is mapped onto center of each burst and the encoded data is mapped onto both sides of the TSC.

19. The apparatus of claim 18, wherein each burst is mapped onto a time slot.

20. The apparatus of claim 16, wherein the determined modulation scheme includes at least one of 16QAM and 32QAM.

* * * * *